Figure 1:
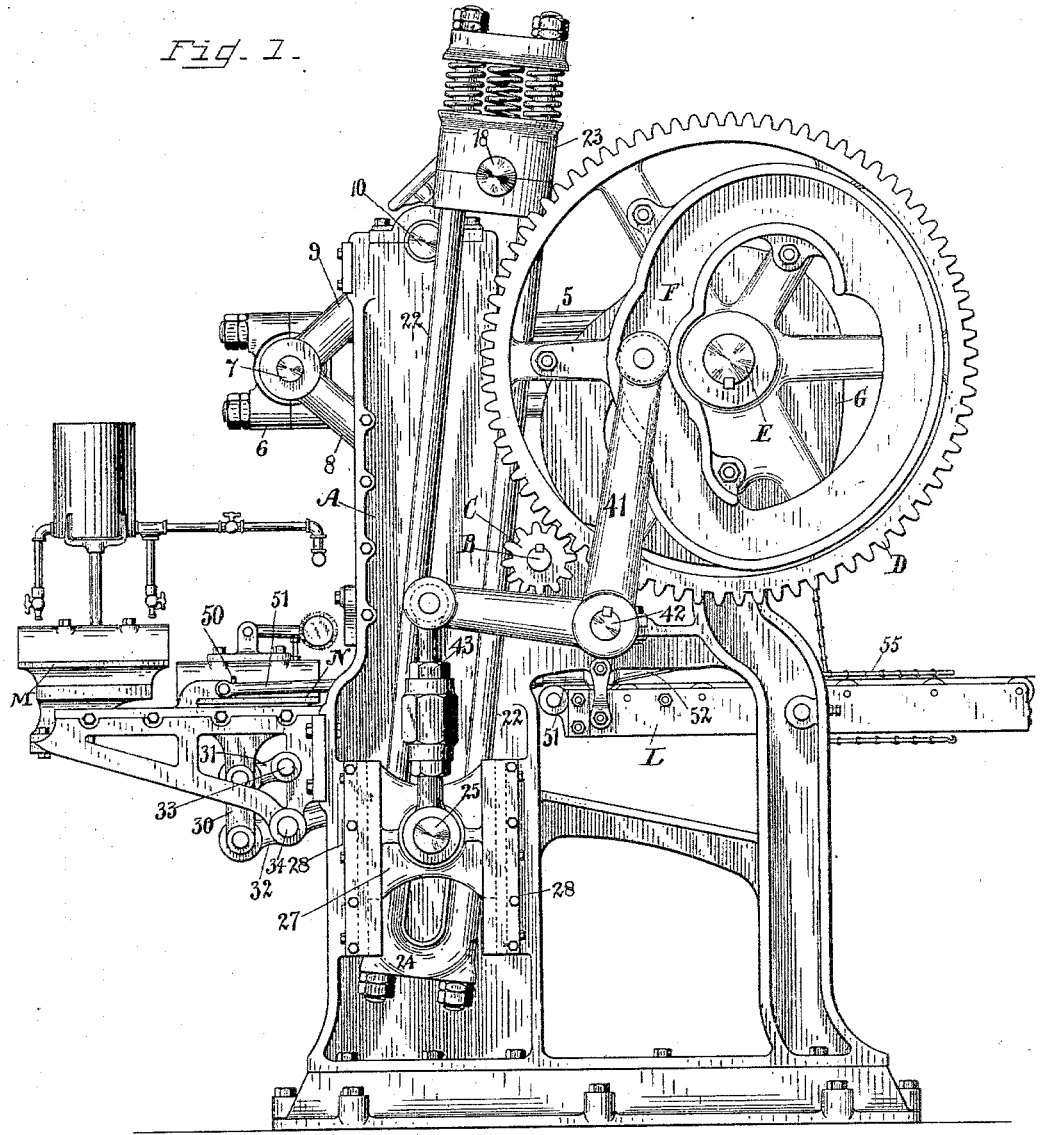

(No Model.) 6 Sheets—Sheet 1.
W. D. RICHARDSON & G. J. HOLL.
BRICK RE-PRESSING MACHINE.
No. 597,656. Patented Jan. 18, 1898.

(No Model.) 6 Sheets—Sheet 2.

W. D. RICHARDSON & G. J. HOLL.
BRICK RE-PRESSING MACHINE.

No. 597,656. Patented Jan. 18, 1898.

(No Model.) 6 Sheets—Sheet 3.

W. D. RICHARDSON & G. J. HOLL.
BRICK RE-PRESSING MACHINE.

No. 597,656. Patented Jan. 18, 1898.

Witnesses.
Louis P. Abell
R. B. Moser

Inventors.
Willard D. Richardson
Gustav J. Holl
by H. J. Fisher Atty.

(No Model.) 6 Sheets—Sheet 4.
W. D. RICHARDSON & G. J. HOLL.
BRICK RE-PRESSING MACHINE.

No. 597,656. Patented Jan. 18, 1898.

Witnesses
Inventors.

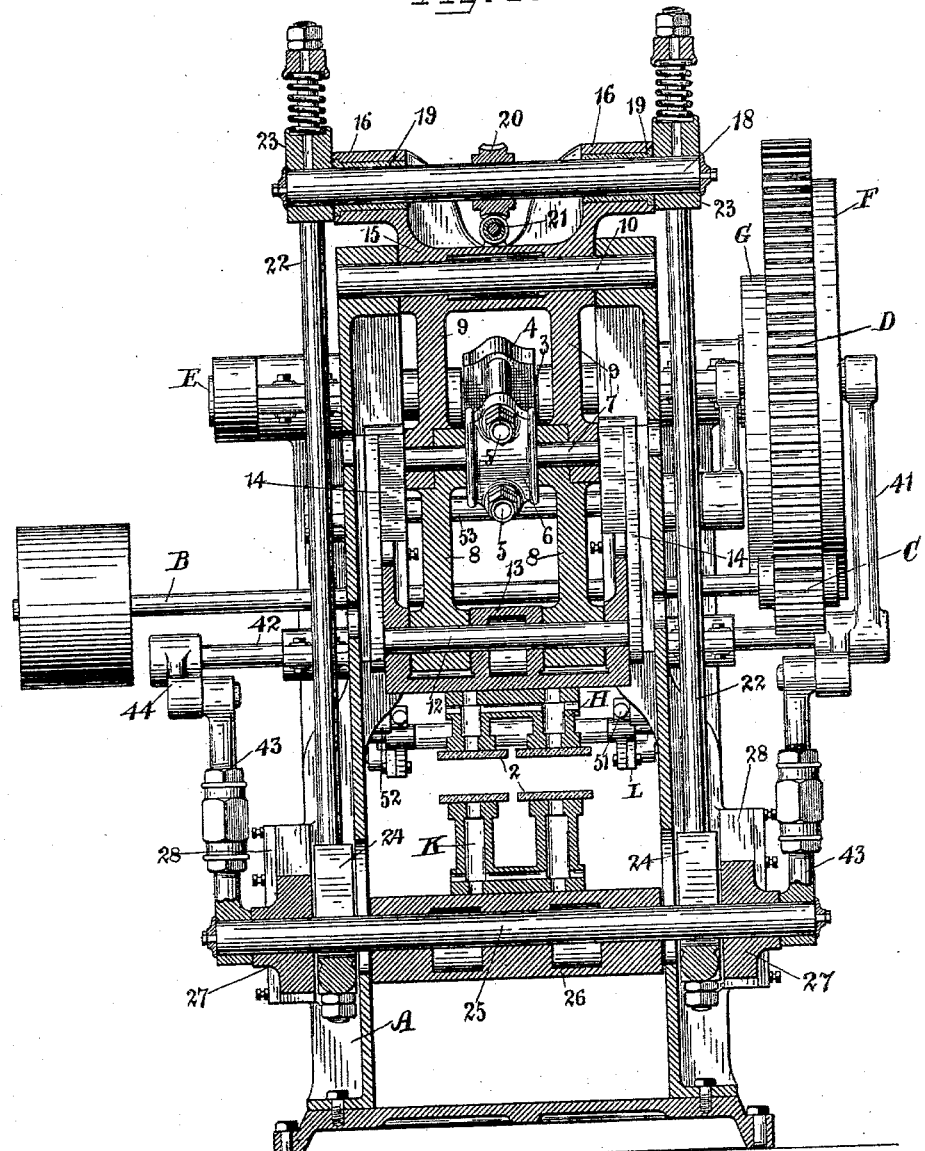

(No Model.) 6 Sheets—Sheet 6.
W. D. RICHARDSON & G. J. HOLL.
BRICK RE-PRESSING MACHINE.
No. 597,656. Patented Jan. 18, 1898.
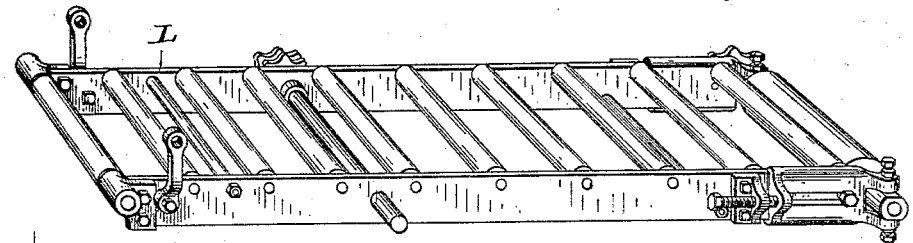
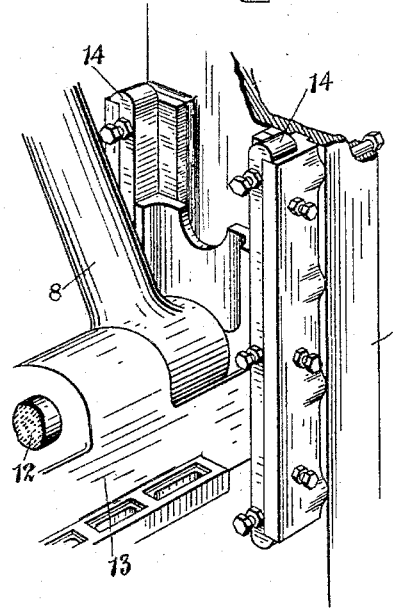
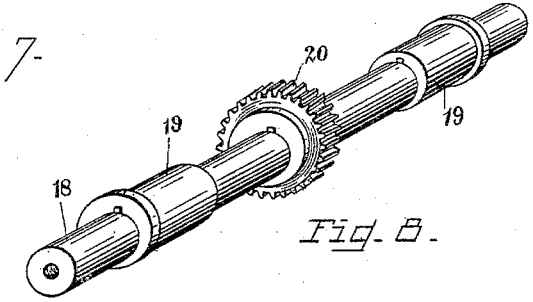
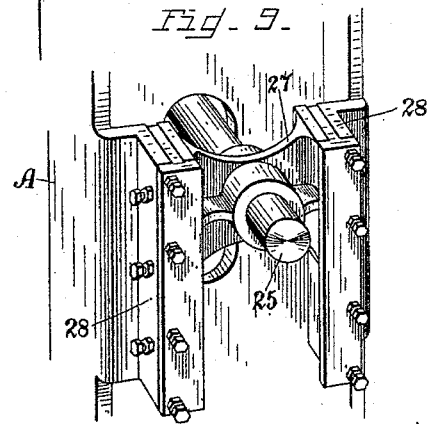

UNITED STATES PATENT OFFICE.

WILLARD D. RICHARDSON AND GUSTAV J. HOLL, OF CLEVELAND, OHIO, ASSIGNORS TO THE OHIO CERAMIC ENGINEERING COMPANY, OF SAME PLACE.

BRICK-RE-PRESSING MACHINE.

SPECIFICATION forming part of Letters Patent No. 597,656, dated January 18, 1898.

Application filed July 25, 1895. Serial No. 557,063. (No model.)

*To all whom it may concern:*

Be it known that we, WILLARD D. RICHARDSON and GUSTAV J. HOLL, citizens of the United States, residing in Cleveland, in the county of Cuyahoga and State of Ohio, have invented certain new and useful Improvements in Brick-Re-Pressing Machines; and we do hereby declare that the following is a full, clear, and exact description of the invention, which will enable others skilled in the art to which it appertains to make and use the same.

Our invention has reference to what are known as "brick-re-pressing machines;" and the objects of the invention are, first, to provide a machine in which the working parts are either above the table or outside of the frame, so as to clear said parts from wear and clogging from the waste clay. In former machines the operating mechanism has been arranged largely in the bottom of the machine and in such position that it was exposed to clay falling from about the plungers and thus causing the said mechanism to be rapidly worn out and destroyed.

A further object of the invention is to provide means for transferring the brick in its original state from the receiving-table to the mold and plungers without injury. Hitherto such transfer has always been attended with more or less marring or breaking of the brick because of the drop it received from the receiving to the transfer table. Our invention obviates the drop and hence the consequent injury, as hereinafter described.

A further object of the invention is to press the brick from the top and the bottom at the same time and by giving two distinct pressures from both top and bottom simultaneously and successively to overcome lamination or seaming that might otherwise occur in the brick.

A further object in the invention is to provide means for quickly and easily adjusting the pressing mechanism, so as to adapt the same to more or less compactness or density of pressure upon the brick and to make bricks of different thickness.

These and other objects not specially enumerated above are accomplished by our machine; and the invention therefore consists in a brick-re-pressing machine constructed and operating substantially as shown and described, and particularly pointed out in the claims.

Figure 2:
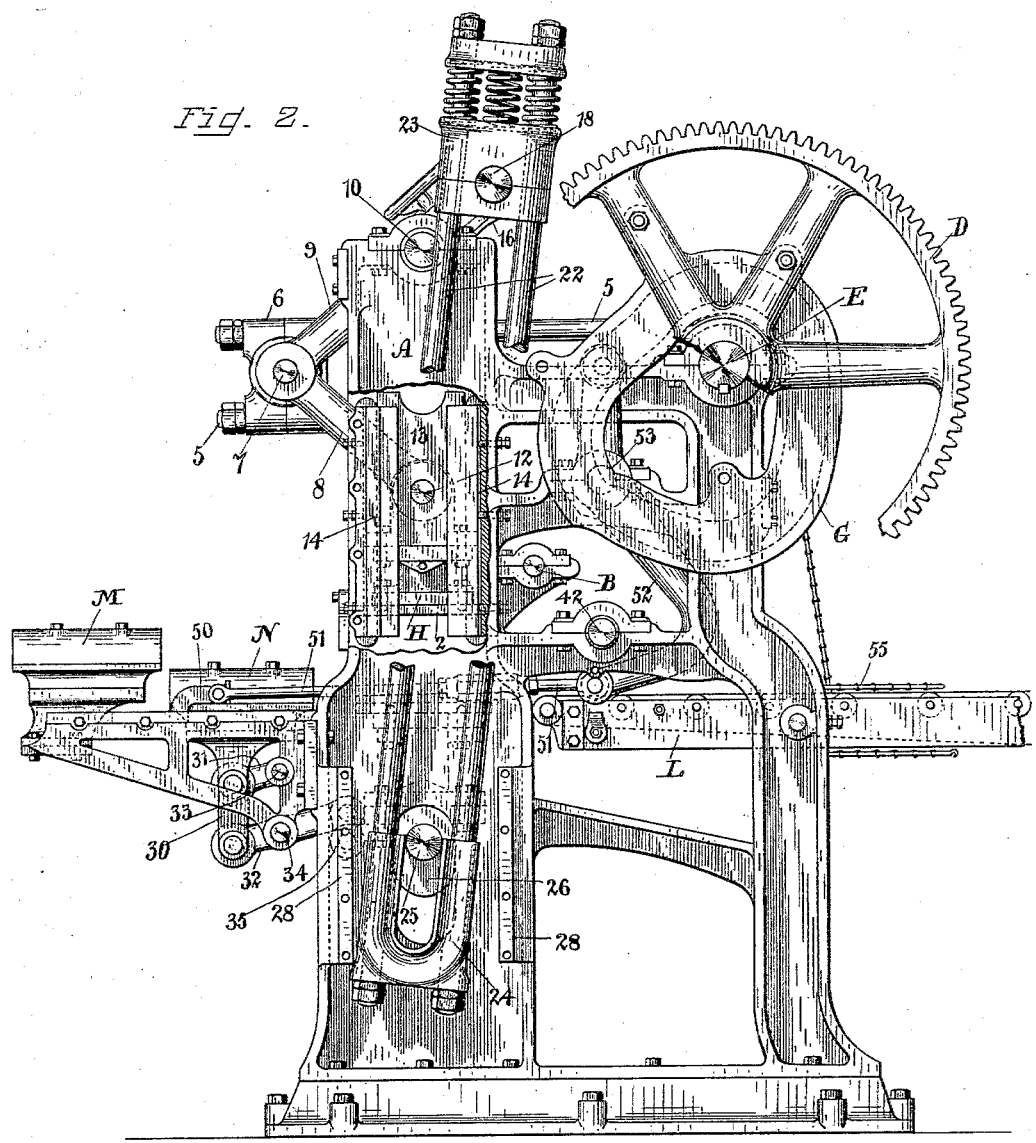
Figure 3:
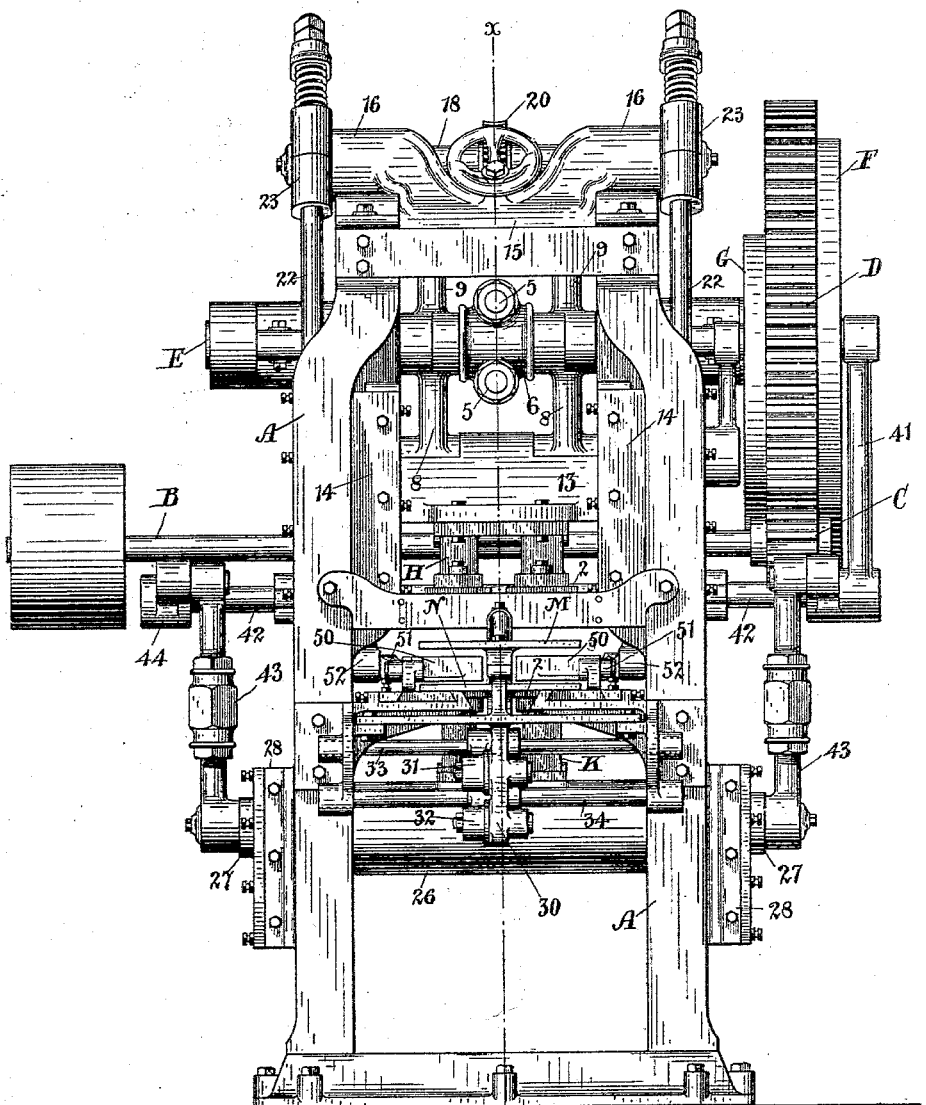
Figure 4:
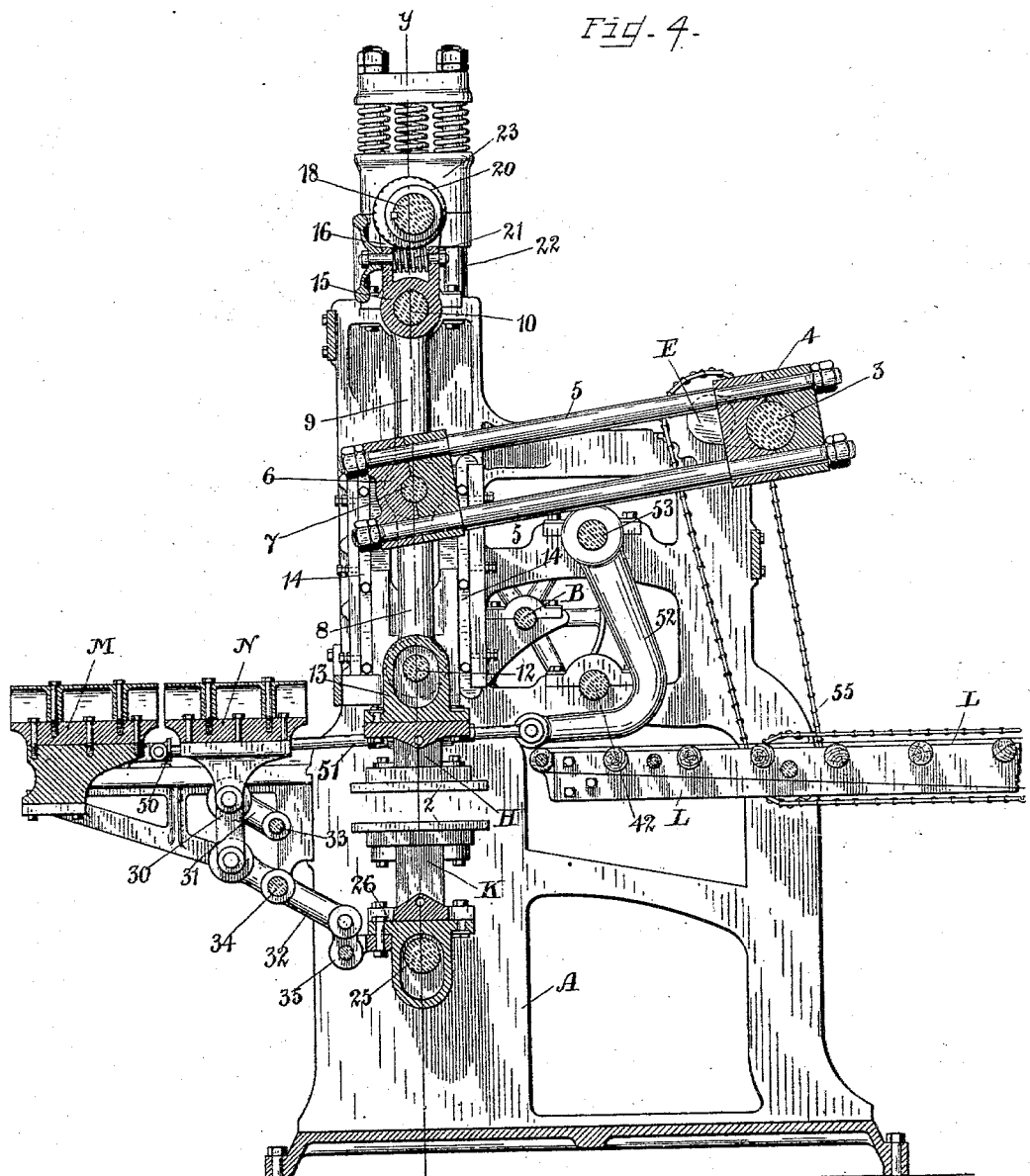

In the accompanying drawings, Figure 1 is a side elevation of our new machine. Fig. 2 is a side elevation corresponding to Fig. 1 with certain parts broken away to show mechanism which would otherwise be concealed. Fig. 3 is a rear elevation of the machine. Fig. 4 is a vertical central sectional elevation on line $x\,x$, Fig. 3, showing the front tables on the same plane and the plungers in pressing relation. Fig. 5 is a vertical central sectional elevation on a line corresponding to $y\,y$, Fig. 4. Fig. 6 is a perspective view of the frame of the roller discharge-table at the rear of the machine to receive pressed brick. Fig. 7 is an enlarged section of a portion of the main frame and one of the plunger-arms and guideways. Fig. 8 is a perspective view of the upper cam-shaft, which supports the parallel side rods 22. Fig. 9 is a perspective view of one of the lower outside guideways and bearings for the lower plunger-shaft and showing the plunger-shaft in its bearing extending through the side of the frame to the outside, as hereinafter fully described.

A represents the main frame of the machine, and B the power-shaft, having a pinion C meshing with the master gear-wheel D. This wheel is supported on a shaft E and has cams F and G on opposite sides and serving to operate the lower plunger and the pushing mechanism for the brick.

The bricks are pressed between the upper and lower plungers H and K, respectively, both said plungers shown here in dual form and having suitable die-plates 2, which enter the mold. (Not shown.) Both these plungers have a vertical movement within certain limits, so as not to press the bricks, but to coöperate with other parts of the machine. We have already said that the upper plunger does the main work in pressing so far as movement is concerned, and that the lower plunger is raised slightly at the same time that the upper plunger is carried down, and that a quickly-following supplemental or return stroke of the plungers occurs after the first and main stroke. We will now explain how these strokes are effected. Thus referring to Figs. 3 and 4, we see that the axle E, carrying the main gear-wheel D, has a crank 3 at the middle of the machine, on which are the bearing and supporting blocks 4. These blocks carry the ends of two parallel operating-rods 5, which connect at their other ends with the bearing-blocks 6, Fig. 5, supported on the cross-rod 7. A pair of toggle-links 8 are pivoted on this cross-rod from below, and a pair of toggle-links 9 are pivoted thereon from above and outside links 8. The links 9 are in turn pivoted on a cross-rod 10, Fig. 5, which is supported in the main frame and forms also a suspensory and upward bearing-bar for the toggle and connected mechanism. At their bottom the toggle-links 8 are pivoted on a cross-rod 12, upon which also is a sliding head 13, Figs. 2 and 7, which carry the upper plunger 8, bolted thereto. Said head 13 is arranged to slide in vertical guideways 14, Fig. 7, in which are removable bearing-strips which can be replaced when worn out.

The toggle-links 9 are united in a head 15, common to both links, and said head has arms 16, Fig. 5, rising therefrom and extending laterally flush with the outside of the machine. The shaft 18, Figs. 5 and 8, is supported in these arms and has cam-bearings 19 fixed to turn therewith in the arms. Then to easily and conveniently turn the shaft we fix thereon the pinion 20, set in such relation to the shaft-bearings 19 that it will at all times be concentric with the center of rotation. A worm-wheel 21, with hand-wheel, serves to actuate the pinion 20, and thereby rotate the shaft 18 and its bearings, and thus effect the adjustment of associated parts, as will now appear.

Referring to Figs. 2 and 5, we see at each side of the machine two parallel rods 22, secured in sets in bearings 23 on the extremities of shaft 18 and at their lower ends in a yoke or head 24. The shaft 25, carrying the lower plunger-head 26, extends through these yokes 24, and on said shaft outside the yokes are bearings 27, adapted to slide up and down in vertical guideways 28, extending outward from the main frame and on the ouside thereof. The head 26 is splined or otherwise rigidly fixed on shaft 25, as are also the sliding bearings 27, so that said guideways serve the same purpose for the plunger-head 26 that they would if they were on the inside of the frame. However, by placing the guides outside the frame we remove them from the dropping of clay that is constantly occurring on the inside of the machine and make them accessible for repairs. The lower plunger K is bolted to head 26, as seen in Fig. 4. The throw of the cranks 3 of the shaft E, and hence of the toggle-links 8 and 9, is sufficient to give all the necessary movement of the plungers H and K toward each other to press the bricks, and in this operation the said plungers are controlled wholly by the mechanism just described, and proceeding from crank 3, through rods 5, toggles 8 and 9, and rods 22, and the plungers and connecting parts—that is to say, when the toggles are brought into vertical position, about as seen in Fig. 4—the upper die is depressed to its maximum. This at the same time swings the side rods 22, which go to the lower plunger into a vertical position and raises the lower plunger accordingly. However, as is obvious, the downward movement of plunger H by the straightening of the toggles is very much more considerable than the upward movement of the lower plunger, so that the pressing occurs from above and when the plungers are in relation to the other parts of the machine, as shown in Fig. 4. It will be noticed that the lower plunger is considerably below the level of the discharge-table L.

The purpose of the adjustment of parts by rotating shaft 18, as before described, will now be clear. As no provision is made for adjustment of the upper plunger, it follows that so far as it is concerned all pressing must be uniform; but by turning shaft 18 and its cam-bearings the side rods 22 can be raised or lowered and thus cause the lower plunger to move to a higher or lower place and correspondingly press the brick more or less closely.

The toggle-links 8 and 9 are so connected with the crank 3, by which they are actuated, that they slightly pass a vertical position to the opposite side when the crank 3 is at the extreme of its stroke. This causes what may be termed a "secondary" or "repeated" thrust to the upper plunger, as above referred to, and is especially serviceable in removing all traces of lamination in the clay, because the repeated thrust seems to weld the clay and make it homogeneous throughout.

Two tables M and N are shown on the front of the machine. M is the receiving-table and N the transfer or feed table. Hitherto in this class of machines the transfer-table has always been permanently on a lower plane, so as to be even or flush with the mold, (not shown,) and hence so far below the receiving-table that the bricks were constantly being damaged when moved or pushed from one table to the other. Our invention provides for a movable table which automatically takes two different levels in succession and conveys the brick from the higher to the lower level without injury. To this end the table N has a downward-projecting portion 30 at its center, to which are pivoted two links 31 and 32, themselves pivoted on cross-rods 33 and 34, fixed in the frame of the machine. The link 32 extends beyond the pivot-rod 34, where it is connected by short link 35 with head 26 of the lower plunger. The links 31 and 32 are parallel and hence raise and lower the table N horizontally and according to the movement of the plunger-head 26. The design is to have the first position flush with table M and the second position down flush with the top of the mold into which the brick to be pressed is passed from the transfer-table. To thus move the table N and the head 26 we provide a cam F, Fig. 1, on the master-wheel D and a bell-crank 41, secured in its angle on the cross-shaft 42 and connected by an adjustable connecting-rod 43 with the sliding bearing 27. This connection is duplicated on the opposite side of the frame, where it is attached pivotally to arm 44, and at its lower end connects with the other bearing 27. The cam F and the connections therewith are so constructed, arranged, and timed that as soon as a brick has been pressed and the upper plunger rises the lower plunger will also rise and take a position flush with discharge-table L. This brings transfer-table N down, as seen in Fig. 2, and then the parts are in position to push the pressed brick onto endless table L and to receive from table N the unpressed brick. The means for effecting this movement of the bricks consists in a pushing device 50, seen in pushing relation in Fig. 1. A rod 51 connects with this pusher, and this rod is actuated by the swinging elbow-shaped arm 52. (Seen in Figs. 2 and 4.) This arm is pivoted at 53, Fig. 2, and its upper shorter portion runs in cam G on the inside of the master gear-wheel D. This cam is so arranged and timed that when the table N is down the pusher will move over it and carry forward the unpressed brick, and then as the table N rises the pusher drops in front of and beneath it and travels back beneath to position to move forward again when the table is again lowered.

A sprocket-chain 55 is shown for actuating endless table L at the tail of the machine for carrying away the pressed brick.

Should it become necessary to effect any adjustment of the transfer-table N, such adjustment can be made by interposing a suitable washer or washers above or below the small bracket which supports link 35, Fig. 4; but if the parts are properly constructed the necessity for such adjustment is not liable to occur.

The object of the invention herein claimed is to allow of the rapid feeding of the repressed bricks by one man without injury to the bricks, and thus occurs by reason of the receiving-table being stationary and adapted to receive all the bricks and the transfer-table being arranged to come to a level with the receiving-table, so that the bricks can be pushed over thereon without falling and breaking, as occurs when the said tables are in different planes.

What we claim is—

1. In a brick-re-pressing machine, the receiving-table for the unpressed brick and the plungers between which the brick is pressed, and a transfer-table between the receiving-table and the plungers and connections therefor to automatically lower and raise the said table, whereby the unpressed brick is handled without injury, substantially as set forth.

2. The plungers and the receiving-table for the unpressed brick, in combination with the transfer-table and means to raise and lower the same and hold the table horizontally at all times, substantially as set forth.

3. The machine described having a set of plungers and a receiving-table, in combination with a transfer-table between the plungers and receiving-table, a set of links connected with the transfer-table to support and operate the same and means to operate said links, substantially as set forth.

4. The main frame, the transfer-table having a downward projection and the lower plunger, in combination with parallel links 31 and 32 pivoted to the main frame and the downward projection on the transfer-table and connections between links 32 and the lower plunger, substantially as described.

5. A stationary receiving-table for the brick, a vertically-movable lower plunger on a plane beneath the plane of the said table, a transfer-table and means to move said transfer-table back and forth from the plane of the receiving-table to the plane of the said plunger, substantially as described.

6. The combination of the movable plungers for pressing the brick, the up-and-down movable transfer-table, a pushing device for the brick constructed and arranged to pass over the transfer-table on its forward movement and beneath said table on its backward movement, and a permanent receiving-table for the brick, substantially as described.

Witness our hands to the foregoing specification on this 16th day of July, 1895.

WILLARD D. RICHARDSON.
GUSTAV J. HOLL.

Witnesses:
H. T. FISHER,
ALLIE ROBERTSON.